US009454456B2

(12) United States Patent
Kwon et al.

(10) Patent No.: US 9,454,456 B2
(45) Date of Patent: Sep. 27, 2016

(54) METHOD FOR SEPARATELY EXECUTING SOFTWARE, APPARATUS, AND COMPUTER-READABLE RECORDING MEDIUM

(75) Inventors: Oin Kwon, Seoul (KR); Giseon Nam, Seoul (KR); Minseok Kim, Seoul (KR); Sung Kim, Gyeonggi-do (KR)

(73) Assignee: SK PLANET CO., LTD. (KR)

( * ) Notice: Subject to any disclaimer, the term of this patent is extended or adjusted under 35 U.S.C. 154(b) by 702 days.

(21) Appl. No.: 13/142,601

(22) PCT Filed: Dec. 21, 2009

(86) PCT No.: PCT/KR2009/007648
§ 371 (c)(1),
(2), (4) Date: Jun. 29, 2011

(87) PCT Pub. No.: WO2010/077000
PCT Pub. Date: Jul. 8, 2010

(65) Prior Publication Data
US 2011/0271260 A1    Nov. 3, 2011

(30) Foreign Application Priority Data

Dec. 29, 2008    (KR) .................. 10-2008-0135308

(51) Int. Cl.
*G06F 9/44*    (2006.01)
*G06F 11/36*    (2006.01)
(Continued)

(52) U.S. Cl.
CPC ....... *G06F 11/3604* (2013.01); *G06F 11/3612* (2013.01); *G06F 21/121* (2013.01); *G06F 21/123* (2013.01); *G06F 11/3466* (2013.01); *G06F 11/3476* (2013.01)

(58) Field of Classification Search
CPC ........ G06F 9/44; G06F 21/22; G06F 21/123; G06F 11/3612
USPC ........................................... 717/138
See application file for complete search history.

(56) References Cited

U.S. PATENT DOCUMENTS 6,308,270 B1 * 10/2001 Guthery ........................ 726/9
6,351,813 B1 * 2/2002 Mooney et al. ............. 713/185
6,892,307 B1   5/2005 Wood et al.
(Continued)

FOREIGN PATENT DOCUMENTS

| JP | 2000-137600 | 5/2000 |
|---|---|---|
| JP | 2002-536743 | 10/2002 |

(Continued)

*Primary Examiner* — Wei Zhen
*Assistant Examiner* — Brahim Bourzik
(74) *Attorney, Agent, or Firm* — Baker Hostetler LLP

(57) ABSTRACT

The present disclosure provides method, system, and computer readable medium for shared execution of software. The present disclosure relates to method, system, and computer readable recording medium for shared execution of software involving identifying the main modules of a specific software by analyzing its control flow, data flow, and modular structure through a static binary analysis and a runtime profiling, i.e. dynamic analysis, separating the modules from the main software body to store them in a secure environment of a smart card, and storing the main body in a user terminal with the identified modules removed and replaced by an interface code, whereby a co-processing the software at the user's end by the smart card in engagement with the user terminal exclusively enables an execution of the software.

4 Claims, 2 Drawing Sheets

(51) Int. Cl.
*G06F 21/12* (2013.01)
*G06F 11/34* (2006.01)

(56) References Cited

U.S. PATENT DOCUMENTS

| | | | |
|---|---|---|---|
| 7,942,325 B2* | 5/2011 | Adams et al. | 235/439 |
| 2002/0073405 A1* | 6/2002 | Chilimbi | 717/151 |
| 2004/0193987 A1* | 9/2004 | Sigbjornsen et al. | 714/741 |
| 2004/0249625 A1* | 12/2004 | Leaming | 703/27 |
| 2007/0101418 A1 | 5/2007 | Wood et al. | |

FOREIGN PATENT DOCUMENTS

| | | |
|---|---|---|
| JP | 2006-164184 | 6/2006 |
| JP | 2006-209660 | 8/2006 |
| KR | 1020010108114 | 12/2001 |

* cited by examiner

METHOD FOR SEPARATELY EXECUTING SOFTWARE, APPARATUS, AND COMPUTER-READABLE RECORDING MEDIUM

TECHNICAL FIELD

The present disclosure relates to method, system, and computer readable recording medium for shared execution of software. More particularly, the present disclosure relates to method, system, and computer readable medium for shared execution of software involving identifying the main modules of a specific software by analyzing its control flow, data flow, and modular structure through a static binary analysis and a runtime profiling, i.e. dynamic analysis, separating the modules from the main software body to store them in a secure environment of a smart card, and storing the main body in a user terminal with the identified modules removed and replaced by an interface code, whereby a co-processing the software at the user's end by the smart card in engagement with the user terminal exclusively enables an execution of the software.

BACKGROUND ART

The statements in this section merely provide background information related to the present disclosure and may not constitute prior art.

Software in general is sold directly off-line on media including CD-ROMs and DVD-ROMs, or downloaded for payments by the consumers through the software maker's Internet venue. For the software buyer/user to install the product and use it, it is necessary to input a provided software authenticating CD-key in the individual terminal whereby the software maker legitimately authorizes the use of the product.

However, due to the bare exposure of the CD-keys in the form of common text they are helplessly copied along with the CD-ROM contents over and over for liberal services to illegitimate third parties. With no bother to search for a CD-key, they reach to employ an extra illegal CD-key generating program or a cracking method into the CD-key authenticating program itself to eventually hack the legitimate copy authentication process even letting P2P sites to uncontrollably distribute among people and thus fatally defeating many efforts to protect the software copyrights.

There is a counter measure that provides the CD-ROM or DVD-ROM at a certain track with authentication information for exclusively permitting the operation of the stored program which in effect incorporates the physical presence of the legitimate medium in the user terminal, but a cracking method to remove the pertinent authentication section from the software body was found to effectively defeat the protection.

In response, an extra hardware device was provided for attachment to a terminal port for printer or a USB port so that its presence is checked or the device is arranged to store encrypting/decoding key values and algorithm until the encrypted code is decoded at the software execution. However, the structural limitation having software at execution be decoded before it gets loadable into the terminal memory allows bypassing the protection scheme to hack into the software frequently and offers an open chance for even the nonprofessional general public to use an available automatic hacking tool to actually commit violations of the copy protection technologies the harder as they get more popular. Besides, virtual machines were used trying to thwart reverse engineering attempts and protect the identifying logic for the authentication key to software, but history shows actual hackings and distributions of automatic hacking tools.

DISCLOSURE

Technical Problem

The present disclosure seeks to prevent an illegal copy of software with the provision of method, system, and computer readable medium for shared execution of the software, which is permitted to run exclusively upon engagement of a smart card with a user terminal.

Technical Solution

To achieve the object, the present disclosure provides a system for shared execution of software comprising: an analyzer for identifying one of a control flow, data flow, and modular structure of the software; a profiler for tagging the executive state and attribute information of the software for its respective modules; an assessor for scoring the profiled function modules based on the attribute information and a user feedback; an extractor for separating the highest scored modules in the assessor from the body of the software; and an interface for inserting an input/output interfacing code to connect the modules separated from the software body with a user terminal binary code.

Another embodiment of the present disclosure provides a method for shared execution of software comprising: identifying one of a control flow, data flow, and modular structure of the software; tagging the executive state and attribute information of the software for its respective modules; scoring the profiled function modules based on the attribute information and a user feedback; separating the highest scored modules in the scoring step from the body of the software; and inserting an input/output interfacing code to connect the modules separated from the software body with a user terminal binary code.

Yet another embodiment of the present disclosure provides a computer readable recording medium for shared execution of software which encodes a computer program that implements on a computer the respective steps of the method for shared execution of software as described above.

Advantageous Effects

According to the present disclosure as above, in a sharp contrast to existing software copy prevention techniques, the code is protected in the physically safer format of the smart card to obviate the possibility of a reverse engineered cracking into unlicensed software. In addition, the present disclosure effectuates the copy prevention in a co-processing scheme of client-server type between the smart card and the user terminal and so obviates the necessity of a dependence on an anti-debugging technique subjected to the system architecture or some coding/decoding methods which may have uncertain effectiveness and create complexity, whereby providing the software industry one less trouble of fighting cracking techniques. Further, the present disclosure resolves faults associated with extra functions installed for the purpose of protecting data communication with dongles or optical media and detecting reverse engineering tools, etc.

MODE FOR INVENTION

Figure 1:
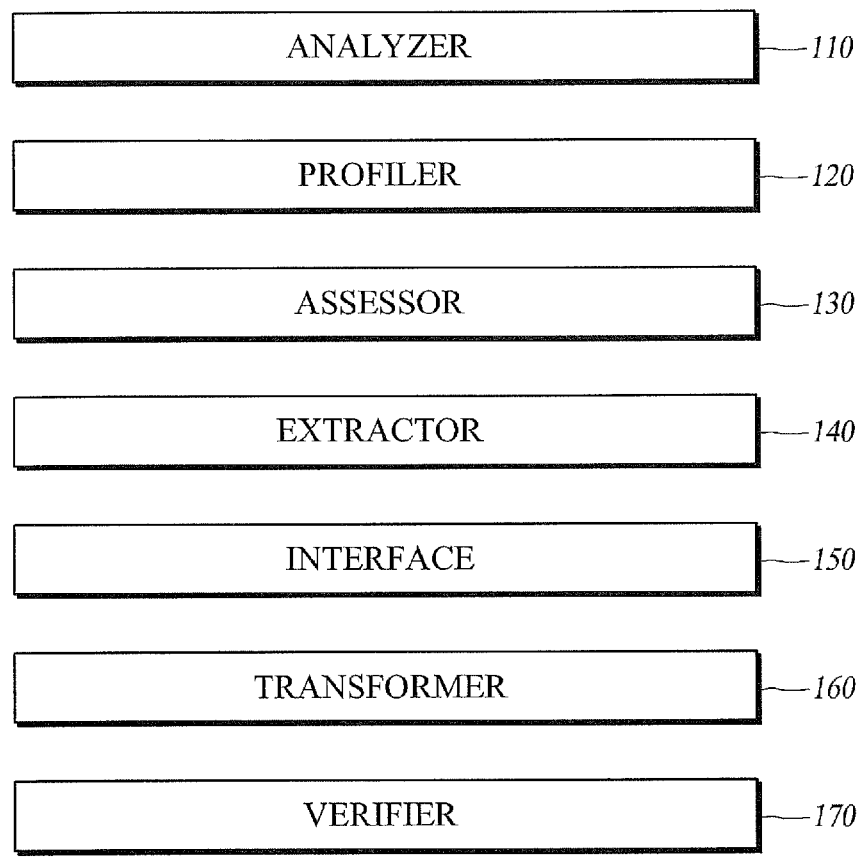
FIG. 1 is a schematic block diagram of a system for shared execution of software in accordance with an embodiment of the present disclosure.

Hereinafter, an exemplary embodiment of the present disclosure will be described with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Also, in describing the components of the present disclosure, there may be terms used like the first, second, A, B, (a), and (b). These are solely for the purpose of differentiating one component from the other but not to imply or suggest the substances, order or sequence of the components. If a component were described as 'connected', 'coupled', or 'linked' to another component, it may mean the components are not only directly 'connected', 'coupled', or 'linked' but also are indirectly 'connected', 'coupled', or 'linked' via a third component.

Referring now to FIG. 1, there is shown a schematic block diagram of a system 100 for shared execution of software in accordance with an embodiment of the present disclosure.

The software shared execution system 100 may comprise an analyzer 110, profiler 120, assessor 130, extractor 140, interface 150, transformer 160, and verifier 170.

In this embodiment, the analyzer 110, profiler 120, assessor 130, extractor 140, interface 150, transformer 160, and verifier 170 constitute the shared execution system 100 of the subject invention although its components or composition can be varied and modified for different applications.

The analyzer 110 performs to investigate the flow of control, data flow, and module structure of the subject software product either by an abstract execution (approximated execution of input data and control flow) through Semantic analysis or an interpreter with a binary file built in an object code being disassembled or in its source file status (in short, by Semantic analysis) or by building a log in the course of injecting and actually executing tracing code for tracing function modules of the subject software which is in its source status or binary code (in short, by dynamic analysis). In order to monitor the software operation or analyze it by prediction, the analyzer 110 employs at least one of instrumentation through a dynamic code injection or source change, a runtime debugger, a virtual machine, and an abstract execution interpreter for predicting the executive status. Meanwhile, the analyzer 110 of the present disclosure may be implemented by instrumentation without departing from the essential characteristics of the present disclosure. The instrumentation may be implemented through performing a function of retrieving the binary code of the software and then injecting the tracing code for tracing the function modules.

The profiler 120 performs to generate the executive status and attribute information tag of the software for its respective modules. The profiler 120 may be implemented through performing a function of generating tracing log information by running the software and creating a tag for each log at the respective procedures of the software without departing from the essential characteristics of the present disclosure.

The assessor 130 performs to score profiled function modules based on the attribute information and a user feedback. The assessor 130 performs to function of calculating scores in accordance with at least one of input/output dynamicity attribute info, attribute info whether the requisite elements to attain specific progressive status are present, stack usage, memory referencing times attribute info, attribute info whether architecture specific instruction is used, usage frequency attribute info, usage point of time attribute info, executive load attribute info, control flow attribute info, attribute info of the number of independent variables in the modules, and attribute info of executive delayed time in the shared execution. The assessor 130 may be implemented through performing a function of assigning scores calculated based on the specific attribute information to the profiled function modules without departing from the essential characteristics of the present disclosure. Also, the assessor 130 may be implemented by calculating scores in accordance with at least one of input/output dynamicity attribute info, code runtime load attribute info, attribute info whether the requisite elements to attain specific progressive status are present, memory referencing times attribute info, attribute info whether architecture specific instruction is used, and usage frequency attribute info.

The extractor 140 functions to separate the highest scored modules in the assessor 130 from the software body. In this separating procedure, the extractor 140 does not separate the architecture specific instruction usage info and the component for a system call. Implementation of the extractor 140 may be made through bodily separating the highest scored function modules in the assessor 130 without departing from the essential characteristics of the present disclosure while refraining from separating the architecture specific instruction usage info and the component for a system call.

The interface 150 replaces code inter-module input/outputs such as stack push/pop, register variables, etc. with a remote procedure call with the smart card. Herein, the user terminal means a terminal provided with devices including a memory for calculating, controlling, and storing software and a microprocessor for executing a program to calculate and control, and it may be one of a personal computer (PC), laptop or notebook computer, personal digital assistant (PDA), and mobile communication terminal. The interface 150 may be implemented by performing a function of inserting an input/output interfacing code for connecting the bodily separated function modules and the binary code for the user terminal without departing from the essential characteristics of the present disclosure. In addition, the interface 150 may be implemented to replace the input/output through the stack push/pop with the USB input/output.

The transformer 160 functions to transform the instruction set of the function modules with the interfacing code inserted according to the architecture of the smart card. Herein, the smart card may mean an IC chip mounted plastic card to handle specific tasks by provision of devices including a microprocessor, card operating system, security module, and memory. The verifier 170 performs the function of verifying the code transformed in the transformer 160 to verify the normal operation thereof.

Also, the system 100 for shared execution of software may additionally comprise an emulator for virtually operating a heterogeneous architecture.

Figure 2:
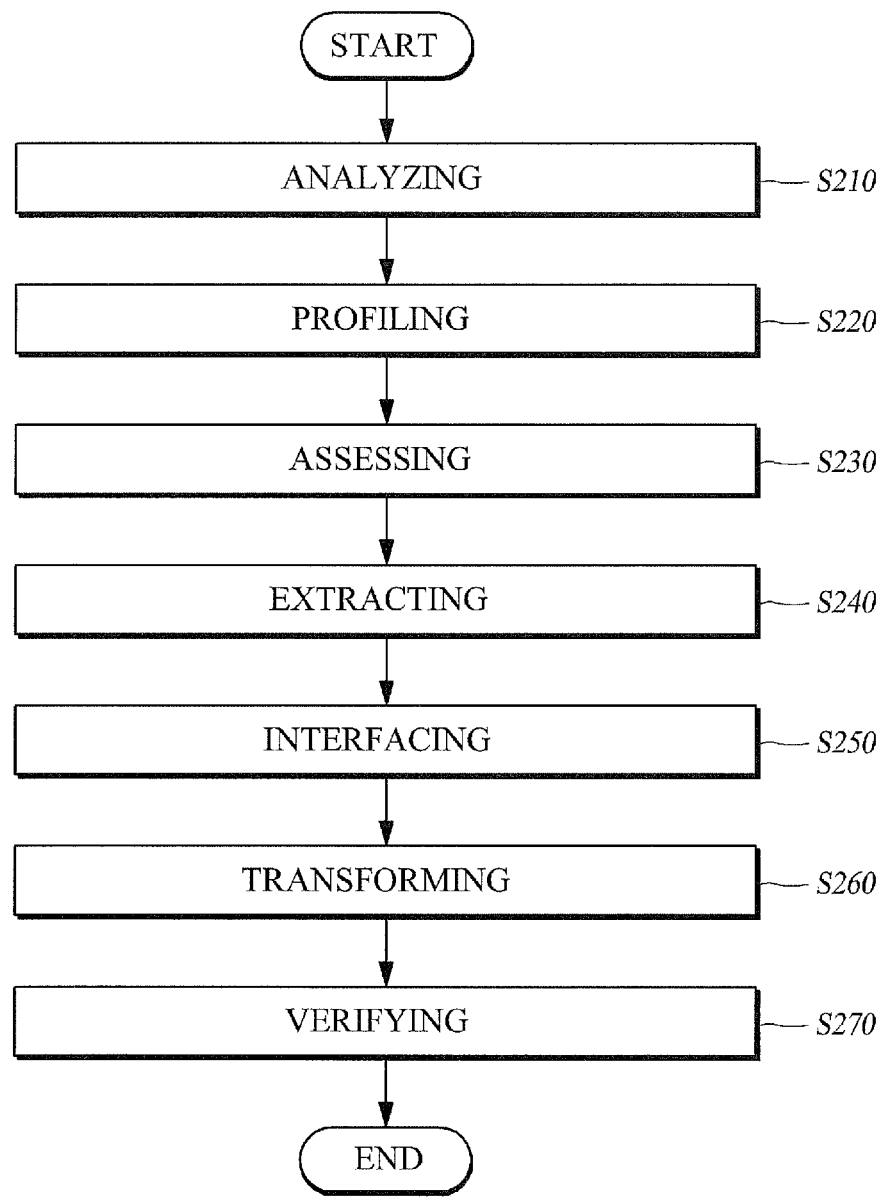
FIG. 2 is a flow chart for illustrating a method for shared execution of software in accordance with an embodiment of the present disclosure.

Referring now to FIG. 2, a flow chart illustrates a method for shared execution of software in accordance with an embodiment.

In step S210, the analyzer 110 analyzes the flow of control, data flow, and module structure of the subject software product. If the analyzer 110 were implemented by an instrumentation unit without departing from the essential characteristics of the present disclosure, the instrumentation may retrieve the binary code of the software and then injects the tracing code for tracing the function modules.

In step S220, the profiler 120 performs to generate the executive status and attribute information tag of the software for its respective modules. The profiler 120 may be implemented through performing a function of generating tracing log information by running the software and creating a tag for each log at the respective procedures of the software without departing from the essential characteristics of the present disclosure. Next, in step S230, the assessor 130 performs to function of calculating scores in accordance with at least one of input/output dynamicity attribute info, attribute info whether the requisite elements to attain specific progressive status are present, stack usage, memory referencing times attribute info, attribute info whether architecture specific instruction is used, attribute info of the number of independent variables in the modules, execution time attribute info, calculation amount attribute info, and usage frequency attribute info. Also, the assessor 130 may be implemented by calculating scores in accordance with at least one of input/output dynamicity attribute info, code runtime load attribute info, attribute info whether the requisite elements to attain specific progressive status are present, memory referencing times attribute info, attribute info whether architecture specific instruction is used, and usage frequency attribute info.

In step S240, the extractor 140 functions to separate the highest scored modules in the assessor 130 from the software body. In this separating procedure, the extractor 140 does not separate the architecture specific instruction usage info and the component for a system call.

In step S250, the interface 150 inserts an input/output interfacing code for connecting the bodily separated function modules and the binary code for the user terminal. For example, the interface 150 replaces inter-module input/outputs such as stack push/pop, register variables, etc. with a remote procedure call. The interface 150 may be implemented by inserting an input/output interfacing code for connecting the bodily separated function modules and the binary code for the user terminal without departing from the essential characteristics of the present disclosure. I.e., the interface 150 may replace the input/output through the stack push/pop with the USB input/output.

In step S260, the transformer 160 transforms the instruction set of the function modules with the interfacing code inserted according to the architecture of the smart card. Finally, in step S270, the verifier 170 performs to verify the code transformed in the transformer 160 through executing it simultaneously with the source code to verify the normal operation of the former. The verifier 170 may be implemented by executing the code transformed in the transformer 160 to verify its normal operation without departing from the essential characteristics of the present disclosure.

Although FIG. 2 illustrates the method for shared execution of software through steps from S210 to S270 in the numerical sequence, it is only to exemplify the technical idea of this embodiment and will be understood by the skilled persons in the art that the method for shared execution of software may execute modified sequence of steps from the FIG. 2 illustration or one or more selected steps from S210 to S270 concurrently or otherwise without restricting FIG. 2 to the serial order within the scope of the essential characteristics of the present embodiment.

As described above, the method for shared execution of software in the disclosed embodiments may be implemented on a computer program and provided in a computer readable recording medium.

The computer readable recording medium which encodes the computer program that implements the respective steps of the method for shared execution of software may comprise any kinds of recording devices for recording data readable by computers.

Examples of such computer readable recording medium include ROM, RAM, CD-ROM, magnetic tapes, floppy discs, and optical data storages, and further comprise an implementation in carrier waves (for example, transmission over the Internet). In addition, the computer readable recording medium may be provided in a distributed processing system where computer systems are networked to store and execute the computer readable codes at distributed locations.

Furthermore, functional programs, codes, and code segments to implement the disclosed embodiments may be easily deduced by programmers skilled in the art thereof.

Also, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined otherwise. Common terms as found in dictionaries should be interpreted in the context of the related technical writings not too ideally or impractically unless the present disclosure expressly defines them so.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes. Accordingly, the scope of the disclosure is not to be limited by the above embodiments but by the claims and the equivalents thereof.

INDUSTRIAL APPLICABILITY

The present disclosure will be useful in various applications that are executable exclusively by a smart card's attachment, in particular, to run software in a shared execution between the open computing environment such as a PC and the covered computing environment such as a smart card.

CROSS-REFERENCE TO RELATED APPLICATION

This application claims priority under 35 U.S.C. §119(a) on Patent Application No. 10-2008-0135308 filed in Korea on Dec. 29, 2008, the entire contents of which are hereby incorporated by reference. In addition, this non-provisional application claims priorities in countries, other than U.S., with the same reason based on the Korean Patent Application, the entire contents of which are hereby incorporated by reference.

The invention claimed is:

1. A system for shared execution of software stored in a user terminal comprising:
  an analyzer which identifies one of a control flow, data flow, and modular structure of the software for defining the software in terms of function modules;
  a profiler for running the software to create a tag of log information at each respective procedure of the software corresponding to the executive state and attribute information for each of the function modules of the software;

an assessor that calculates and assigns a score value to each of the function modules profiled in the profiler based on at least one of input/output dynamicity attribute info, attribute info whether the requisite elements to attain specific progressive status are present, stack usage, attribute info, attribute info whether architecture specific instruction is used, usage point of time attribute info, executive load attribute info, control flow attribute info, attribute info of the number of independent variables in the modules, and attribute info of executive delayed time in the shared execution;

an extractor that separates the function modules based on assigned score values and extracting the modules assigned the highest score values from the remaining software function modules in the user terminal;

a storage unit that stores the extracted function modules in a secure environment separated from the remaining software function modules;

an interface that inserts an input/output interfacing code to reconnect the extracted function modules into the software using a user terminal binary code;

a transformer that transforms an instruction set of the function modules with interfacing code inserted according to the architecture of a smart card;

an emulator that virtually operates a heterogeneous architecture; and a verifier to verify the code transformed in the transformer through executing it simultaneously with a source code to verify the normal operation of said interfacing code;

wherein the extractor does not separate the architecture specific instruction usage info and the component for a system call in the process of separating the highest scored function modules from the software.

2. The system for shared execution of software in claim 1, wherein the software comprises software of at least one of instrumentation through a dynamic code injection, a runtime debugger, a virtual machine, and an abstract execution interpreter for predicting the executive status.

3. A method for shared execution of software stored in a user terminal comprising:

identifying one of a control flow, data flow, and modular structure of the software for defining the software in terms of function modules;

running the software to create a tag of log information at each respective procedure of the software corresponding to the executive state and attribute information for each of the function modules of the software;

assigning a score value to each of the function modules based on at least one of input/output dynamicity attribute info, attribute info whether the requisite elements to attain specific progressive status are present, stack usage, attribute info, attribute info whether architecture specific instruction is used, usage point of time attribute info, executive load attribute info, control flow attribute info, attribute info of the number of independent variables in the modules, and attribute info of executive delayed time in the shared execution;

separating and extracting the function modules having the highest score values from the remaining software function modules in the user terminal;

storing the separated and extracted function modules in a secure environment independent of the remaining function modules in the software;

inserting an input/output interfacing code to reconnect the separated function modules with the software function modules remaining in the user terminal using a user terminal binary code;

transforming an instruction set of the function modules with interfacing code inserted according to the architecture of a smart card; and verifying the code transformed in the transformer through executing it simultaneously with a source code to verify the normal operation of said interfacing code;

wherein separation step, the extractor does not separate the architecture specific instruction usage info and the component for a system call in the process of separating the highest scored function modules from the software.

4. A non-transitory computer readable medium which encodes a computer program that implements on a computer the respective steps of the method for shared execution of software in claim 3.

* * * * *